(12) United States Patent
Norris et al.

(10) Patent No.: US 7,158,588 B2
(45) Date of Patent: Jan. 2, 2007

(54) SYSTEM AND METHOD FOR OBTAINING ACCURATE SYMBOL RATE AND CARRIER PHASE, FREQUENCY, AND TIMING ACQUISITION FOR MINIMUM SHIFT KEYED WAVEFORM

(75) Inventors: James A. Norris, Fairport, NY (US); Clifford Hessel, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 1017 days.

(21) Appl. No.: 10/158,923

(22) Filed: Jun. 3, 2002

(65) Prior Publication Data

US 2003/0223513 A1    Dec. 4, 2003

(51) Int. Cl.
*H03D 3/00* (2006.01)
*H04L 27/14* (2006.01)
(52) U.S. Cl. ................ 375/336; 375/335; 375/337; 375/274; 375/275; 455/502
(58) Field of Classification Search ........... 375/329, 375/334, 336, 340, 362–368, 222, 266, 274, 375/275; 370/203; 455/502
See application file for complete search history.

(56) References Cited

U.S. PATENT DOCUMENTS

| | | | | |
|---|---|---|---|---|
| 5,289,391 A | * | 2/1994 | Ibrahim et al. | 702/74 |
| 5,311,553 A | * | 5/1994 | Chennakeshu et al. | 375/265 |
| 6,970,518 B1 | * | 11/2005 | Kuffner et al. | 375/259 |
| 7,039,105 B1 | * | 5/2006 | Baker et al. | 375/240 |

* cited by examiner

*Primary Examiner*—Mohammed Ghayour
*Assistant Examiner*—Qutub Ghulamali
(74) *Attorney, Agent, or Firm*—Duane Morris LLP

(57) ABSTRACT

The present invention relates generally to communication systems, both wired and wireless, employing a continuous phase modulation ("CPM") waveform with a minimum shift keying ("MSK") preamble. The present inventive system and method uses information from contiguous Fourier Transforms taken on contiguous data blocks to determine baud rate, phase, frequency offset, and bit timing of the CPM waveform or can be used to determine the frequency of continuous wave waveform. More particularly, the inventive system and method is applicable to the military satellite communications UHF frequency band for deciding whether a signal of interest is.

78 Claims, 7 Drawing Sheets

SYSTEM AND METHOD FOR OBTAINING ACCURATE SYMBOL RATE AND CARRIER PHASE, FREQUENCY, AND TIMING ACQUISITION FOR MINIMUM SHIFT KEYED WAVEFORM

BACKGROUND OF THE INVENTION

The present invention relates generally to communication systems, both wired and wireless, employing a continuous phase modulation ("CPM") waveform. One such CPM waveform is known as minimum shift keying ("MSK") modulation. The present inventive system and method is applicable to all communication systems and radio frequency bands which utilize an MSK preamble, defined below, to determine baud rate, phase, frequency offset, and bit timing. More particularly, the inventive system and method is applicable to the military satellite communications UHF frequency band for deciding whether a signal of interest is present.

Many communication systems or networks, both wired (e.g., Ethernet) and wireless (e.g., HF, VHF, UHF radio), utilize a preamble to determine the modulation carrier frequency and phase. A MSK waveform with an alternating sequence, e.g., 1,1,0,0,1,1,0,0, . . . , has a characteristic frequency spectrum, sometimes referred to as the "MSK Tones" which also, in addition to carrier frequency and phase, provides modulation symbol rate and accurate baud timing of the MSK waveform. The preceding MSK alternating sequence may be written as $[(1\cdot2),(0\cdot2)]^m$ which may be generalized in the following form: $[(1\cdot n),(0\cdot n)]^m$ where the variable "n" may be referred to as the "symbol repetition factor" and the variable "m" may be referred to as the "symbol pair repetition factor". Other MSK waveforms that fit this general pattern, e.g., 1,1,1,0,0,0,1,1,1,0,0,0, . . . , which can be written as $[(1\cdot3),(0\cdot3)]^m$ and 1,1,1,1,0,0,0,0,1, 1,1,1,0,0,0,0, . . . , which can be written as $[(1\cdot4),(0\cdot4)]^m$, are all contemplated by the present inventive system and method.

There are several problems with using an MSK waveform preamble for waveform detection and parameter estimation which must be overcome in order to allow for accurate measurement of symbol rate, frequency, phase, timing, and signal strength (measured, for example, as signal-to-noise ratio, carrier-to-interference ratio, etc.). In most communication systems it is highly desirable to limit the preamble time and begin to transmit information-carrying data as soon as possible since the preamble essentially displaces data-carrying capability. However, limiting the preamble time has the effect of limiting the signal energy of the preamble which increases the difficulty in finding the characteristic MSK tones in the frequency spectrum due to noise. The transition in energy at the start of the preamble exacerbates this problem because the unit step in energy at the start of the preamble induces tones in the frequency spectrum, making it harder to distinguish the MSK tones from the noise. This forces the acquisition algorithm to pay close attention to gain control because amplitude changes, which are usually implemented in gain "steps", also add tones to the frequency spectrum. Additionally, tones are introduced to the frequency spectrum due to amplitude changes which are typically implemented in predetermined step changes by the gain control algorithm. Therefore, the gain control algorithm must attempt to minimize the number of step changes in order to minimize the introduction of tones into the frequency spectrum and thereby maximize the ability to detect the MSK tones.

The implementation of the Fourier Transform ("FT") or the Laplace Transform ("LT") are common methods to convert time domain data to frequency domain data for analysis. The FT has discrete bins which contain the energy as correlated with a frequency offset for each bin. The Fourier Transform may be implemented as a Discrete Fourier Transform ("DFT") or as a Fast Fourier Transform ("FFT") in those devices that are computationally-limited. It is to be understood that any method for converting time domain data to frequency domain data, such as Fourier Transforms, Laplace Transforms, discrete cosine, etc., are contemplated by the present invention and any method for converting time domain data to frequency domain data may be referred to herein, individually and/or collectively, as a Fourier Transform, or "FT" as would be consistent in the context as used.

The use of a FFT to find MSK tones at a specific spacing equal to one-quarter of the symbol rate of the received signal is described in the paper "An Innovative Synchronization Preamble for UHF MILSATCOM", authored by Mark Miller, Mark A. Harris, and Donald R. Stephens (the "Miller Paper"), which is hereby incorporated herein by reference. This paper only describes the use of the FFT to find the MSK Tones and implies the use of a correlation function to determine the characteristic spacing of the MSK Tones. It describes the use of the FFT Bin number to find the Carrier Frequency and the Phase value of that center bin to find the Carrier Phase. It describes the use of the Phase difference between the carrier signal and the +/−1 MSK Tones to determine symbol phase (timing). However, use of the method disclosed in the Miller Paper results in a lot of false alarms, e.g., reporting a detection on noise, a foreign signal, or on an impulse signal. Part of the problem with the procedure used in the Miller paper is that the use of the center frequency of the bin with the largest amplitude is at best a rough estimate of the frequency of the carrier. The invention herein described includes the functionality of signal detection as well as a much more accurate method of signal parameter estimation. The present inventive system and method overcomes the problems of the prior art as detailed below.

Generally, there are two major issues with the FT approach to finding the characteristic MSK tones. The first problem deals with computational horsepower required to perform an FT. For example, a FT or DFT may be computationally burdensome, typically requiring $N^2$ operations where N is the number of frequency bins. A FFT, by contrast, typically only requires $N*\log(N)$ operations and is therefore less computationally burdensome. However, with either an FT, DFT, or FFT, the fewer the number of bins the less frequency resolution is attainable. Therefore, an undesirable tradeoff is required between computational intensity and frequency resolution. Typical prior art solutions strike a compromise between computational intensity and frequency resolution by merely using the center frequency bin of the FT. The present inventive system and method overcomes the compromise problem by taking two contiguous FTs and, generally, determining the difference in phase for the bin of the center (carrier) frequency of the contiguous FTs to accurately determine the waveform frequency. The actual implementation used will be discussed in detail further below.

The second major issue with the FT implementation is that any frequency which is not an exact integer multiple of the data sample rate divided by the number of FT bins ends up with energy split between two adjacent bins of the FT.

This effect tends to hide the characteristic MSK tones in the surrounding noise. The present inventive system and method solves this problem by multiplying the input data by a constant tone which may correspond to exactly ½ bin frequency, or some other fraction of bin frequency, and then performing another FT on the input data that has been multiplied by the constant tone and comparing the results with the results of the FT performed on the non-multiplied input data. The procedure creates two FT's on the same time-domain data. In one case, the carrier frequency will be located more closely to the center of an FT bin. In the other case, the carrier frequency will be located closer to the edge of the bin which may cause energy spillover into the next, adjacent FT bin. This energy spillover is undesired because it reduces the apparent signal strength in relation to the noise energy. The worst case situation occurs when tone appears exactly on a bin edge. In this case, the tone energy will be equally distributed between the two adjacent FT bins. For the single bin of interest (the transmitted carrier frequency), the apparent signal to noise ratio is 3 dB (a power ratio of 2) less than the signal to noise ratio which would be apparent if the FT was modified to locate the transmit carrier tone at the center of an FT bin. With two candidate FT's, choosing the transmit carrier frequency which has the highest magnitude will provide the best possible representation of the transmitted signal (in the frequency domain). This will improve the apparent signal to noise ratio which will improve the signal estimation performance in noisy environments.

The MSK preamble has an additional problem because a Fourier Transform of time domain data which is not an exact multiple of MSK symbols of the $[(1 \cdot n),(0 \cdot n)]^m$ pattern has an effect of varying the amplitude of the characteristic tones with respect to each other in a "walking" type pattern, i.e., the tone energy is constant but the tones repeated throughout the spectrum will not have a symmetric pattern in amplitude. This effect increases the difficulty in finding the characteristic (MSK) tones in the noise. To resolve the problem, the inventive system and method utilizes a polyphase resampler (interpolation and decimation method) to exactly place the sample rate of the time domain signal at an exact integer multiple of the symbol rate of the MSK waveform.

Thus there is a need for a system and method which can detect a continuous phase modulation waveform with a shortened MSK preamble and overcome the limitations of prior art systems/methods.

The present inventive system and method separates the detection and estimation functions. During detection, the baud rate is calculated as a first estimated parameter which is then utilized by the receiver for tailoring the signal sample rate and bandwidth to better match the incoming signal before calculating the transmitted carrier frequency, phase, and bit timing. The signal to noise ratio improvement which results from the tailoring process (of resampling and filtering) consequently improves the accuracy of the calculated values. The method described in the Miller paper does not separate the detection and estimation functions and therefore cannot accommodate the tailoring of the sample rate and bandwidth to match the incoming signal.

Additionally, the present inventive system and method performs a baud rate calculation by sorting the FT tones in order of amplitude and measuring the bin distance between the closest two tones. The expected value of the two closest tones is equal to the symbol rate divided by 2n where "n" is the number of bit repeats in the preamble from the $[(1 \cdot n),(0 \cdot n)]^m$ form of the MSK preamble. This baud rate calculation greatly improves the baud rate estimation algorithm as compared to the correlation described in the Miller paper because the inventive method takes advantage of the large signal to noise ratio apparent in a FT bin that contains a large signal level. The correlation method from the Miller paper integrates the noise in the entire range of frequencies which cover the transmit carrier frequency (e.g., +/−1500 Hz) and the MSK Tones (e.g., +/−28,000 Hz), which results in a sum of +/−29,500 Hz added into the correlation function. Additive White Gaussian Noise is, by definition, equally distributed in each frequency bin and the correlation process proposed in the Miller paper would integrate the noise in all of those bins. The sorting method used by the present invention excludes energy in those bins which do not contain enough signal energy to cause a signal detection. Therefore, the present invention excludes the noise from the baud rate estimation calculation as will become apparent in the detailed description below.

Furthermore, the detection calculation of the present invention determines the amplitude of largest tone (typically the carrier frequency) and adds the amplitudes of the +/−1 MSK Tones and the +/−2 MSK Tones in the signal detection calculation. The Miller paper does not address detection of the incoming signal at all.

The present invention also uses two adjacent FT windows to measure the phase difference of the carrier frequency between the two windows to thereby accurately determine the carrier frequency. Moreover, the present invention uses ½ tone spacing in a third FT window in order to place the amplitude of the carrier frequency in the most advantageous location so that carrier energy is not dispersed between two FT bins, as it would be if the carrier frequency were located at (or near) the edge of a bin. It is to be understood that the present invention contemplates offsetting the third FT by any amount, and is not limited in any way to just ½ tone spacing, so as to place the carrier frequency in the middle of the bin. The Miller paper is silent on the use of adjacent FT bins as well as on the use of a third FT spaced apart by a half tone.

One embodiment of the present invention avoids the problems of the prior art by using two or more contiguous Fourier Transforms for detecting a continuous phase modulation waveform and determine the characteristics of the waveform such as frequency, phase, timing, and signal strength.

Accordingly, it is an object of the present invention to obviate many of the above problems in the prior art and to provide a novel system and method for detecting a continuous phase modulation waveform.

It is another object of the present invention to provide a novel system and method for determining the waveform characteristics of a continuous phase modulation waveform.

It is yet another object of the present invention to provide a novel system and method for using two or more Fourier Transforms in the detection of a continuous phase modulation waveform with an MSK preamble.

It is still another object of the present invention to provide a novel system and method for using two or more Fourier Transforms to determine the characteristics of a received continuous phase modulation waveform with an MSK preamble.

It is a further object of the present invention to provide a novel system and method for using two or more Fourier Transforms for acquiring a continuous phase modulation waveform with an MSK preamble.

It is yet a further object of the present invention to provide a novel system and method of determining the frequency of a received and detected continuous wave waveform.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
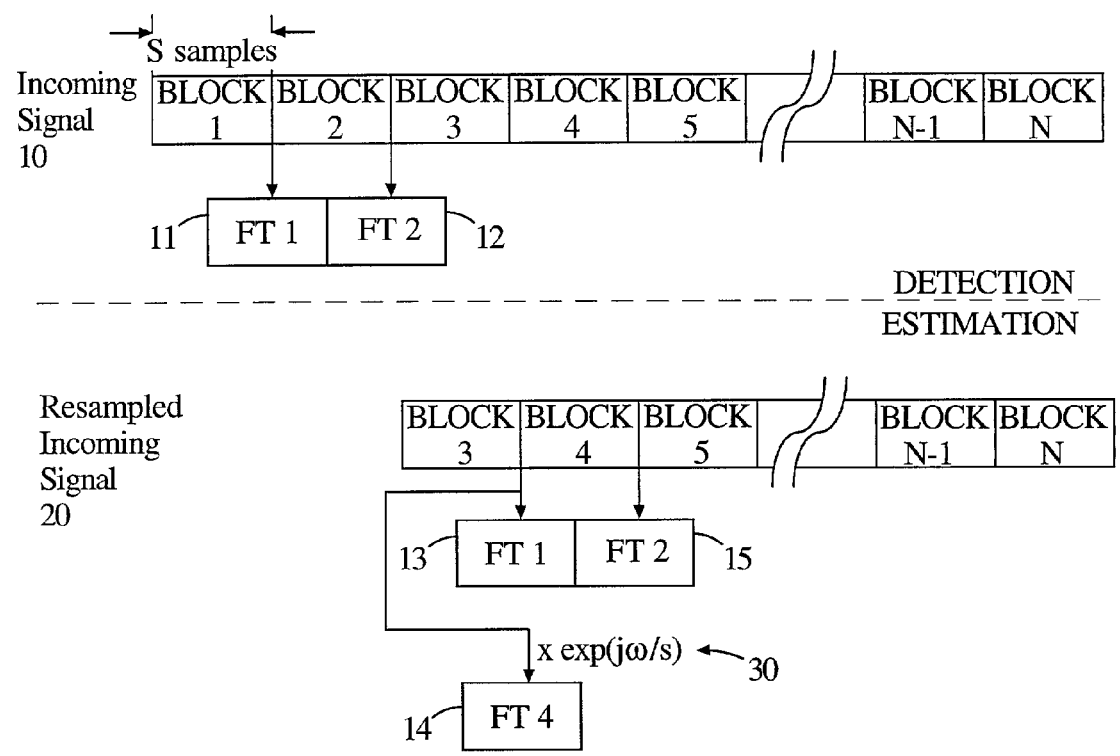
FIG. 1 is a diagram showing an incoming signal being divided into blocks, contiguous Fourier Transforms (FT1 and FT2) being taken, resampling the blocks and another set of contiguous Fourier Transforms (FT3 and FT4) being taken, multiplication of a block of data by a tone and another Fourier Transform (FT5) being taken.

With reference to the drawings, like numerals represent like components/steps throughout the several drawings.

Many communication systems, both wired and wireless, use Continuous Phase Modulation ("CPM") waveforms. One particular type of CPM waveform is the Minimum Shift Keyed ("MSK") waveform. As is known in the art, an MSK waveform with an alternating sequence, such as 1,1,0,0,1, 1,0,0, . . . , generalized to the form: $[(1 \cdot n),(0 \cdot n)]^m$, also referred to herein as an "MSK preamble", has a characteristic frequency spectrum from which can be used to determine parameters of the received signal, such as carrier frequency, carrier phase, modulation symbol rate and baud rate. The present inventive system and method makes use of two or more contiguous Fourier Transforms, Discrete Fourier Transforms, and/or Fast Fourier Transforms to determine the aforementioned parameters. It is to be understood that any MSK waveform of the generalized form, i.e., where n=1, 2, 3, . . . , is contemplated by the present inventive system and method.

An MSK waveform of the above generalized form has a frequency spectrum which has a tone at the carrier frequency and characteristic tones which are spaced at the waveform symbol rate divided by 2n. For example, for the alternating sequence 1,1,0,0,1,1,0,0, . . . , the characteristic tones are spaced apart from the carrier frequency by the waveform symbol rate divided by 4. Although this property of the MSK waveform is well documented, the present inventive system and method describes an approach to the accurate detection and estimation of the MSK preamble that is both innovative and easily implemented.

If the input to a FT is a time domain signal, the output of an FT is a frequency domain signal in a predetermined number of bins. Each bin, by itself, can give an estimate of the frequency and phase of the incoming signal. However, the estimate is typically too inaccurate to allow for accurate parameter estimation. The FT frequency domain output counts the number of cycles of the input time domain waveform. For example, bin 5 of a FT will typically represent frequencies between 4½ and 5½ Hz, or cycles. Bin zero (sometimes referred to herein as bin 0), typically the first bin of the FT, is the bin that includes a zero offset between the transmitter and the receiver, which implies that the transmitter and receiver are synchronized. For example, for a FT with 256 bins, numbered 0 to 255, bin 0 is the zero offset bin with the offset increasing from bin 1 through bin 255 such that bin 255 has the same magnitude, but opposite direction, offset of bin 1. Therefore, the bins can be ordered in a series with bin 0 in the middle of the series and the same magnitude offsets being the same number of bins away from bin 0. For example, the ordering of the FT bins in a series for a maximum offset of 6 bins in either direction from the zero offset bin (bin 0) would be:

| BIN 250 | BIN 251 | BIN 252 | BIN 253 | BIN 254 | BIN 255 | BIN 0 | BIN 1 | BIN 2 | BIN 3 | BIN 4 | BIN 5 | BIN 6 |
|---|---|---|---|---|---|---|---|---|---|---|---|---|

It is to be understood that in the above explanation, the use of 256 bins is exemplary only and the present invention contemplates the use of any number of bins. Additionally, the placement of Bin 0 is arbitrary and can be placed anywhere in the series of bins.

The present inventive system and method makes use of contiguous, non-overlapping FTs, from contiguous, non-overlapping samples, in order to accurately determine the parameters of the received signal. In doing so, the magnitude and phase of the various FT bins are utilized. For example, the phases of the contiguous FTs are used to determine frequency of the received signal. The more contiguous FTs that are used, the higher the resolution and the more accurate the estimate of the frequency. It is to be understood that although the present description may recite only two contiguous FTs, the present inventive system and method contemplates the use of two or more contiguous FTs.

With attention now to FIG. 1, an incoming signal 10 is received by the receiver. What is meant herein by "received" is that the raw incoming data, at the predetermined sampling rate, enters the processing circuitry at the receiver. The incoming signal may be any CPM signal with an MSK preamble transmitted over any medium. Specifically, the signal may be a signal on the Military Satellite Communications UHF Frequency band. In order to detect the incoming signal 10 and determine the characteristics of the signal, the signal is divided into N equal blocks of a predetermined number of samples, as is known in the art. One embodiment of the present invention utilizes a block size of 256 samples.

The block of data designated Block 1 may generally be thought of as the block of samples that contain the initial received energy of the incoming CPM signal. The subsequent blocks are each contiguous with their immediate neighbors. The first Fourier Transform, designated as FT1, is taken on the data Block 1. FT2 then begins with the sample immediately after FT1 ends, so that FT1 and FT2 are contiguous without any overlap. The information derived from either FT1 or FT2 as well as other known information about the incoming signal, such as maximum allowable carrier offset and maximum symbol rate, are sufficient for detecting the incoming signal 10. A FT may be performed on the other data blocks, but are not shown in FIG. 1 for clarity purposes.

The incoming signal 10, or parts thereof, are resampled to thereby create the resampled incoming signal 20. Typically, data Block 1 and data Block 2, which were used for detection purposes, will not be resampled, although resampling those two data blocks is contemplated by an embodiment of the present invention. The resampled rate is typically lower than the sampling rate in order to ensure adequate sampling of the incoming signal. However, it is contemplated that the resampled rate may also be the same as or faster than the original sampling rate. The FT3 is taken on the resampled data Block 3 and the FT5 is taken on the resampled data Block 4 such that the FT3 and the FT5 are contiguous. A FT may also be performed on the other resampled data blocks, but those FTs are not shown in FIG. 1 for the sake of clarity. The resampled data Block 3 is modified by multiplying by a tone, $\exp(j\omega/s)$ where "$\omega$" is the frequency and "s" is the new sample rate, then FT4 is taken on the modified resampled data Block 3. Preferably, the tone shifts the data in resampled Block 3 by ½ the bin spacing. The ½ bin spacing shift is exemplary only and is not meant to limit the application in any way. Other bin spacings are contemplated, but shifting by ½ bin spacing allows for the greatest amount of resolution as will become apparent in the discussion below.

As discussed in more detail below, the information from the FT3, FT4, and FT5 operations, in addition to the information provided above for detection, allow the characteristics of the incoming signal 10 to be accurately estimated.

Figure 2A:
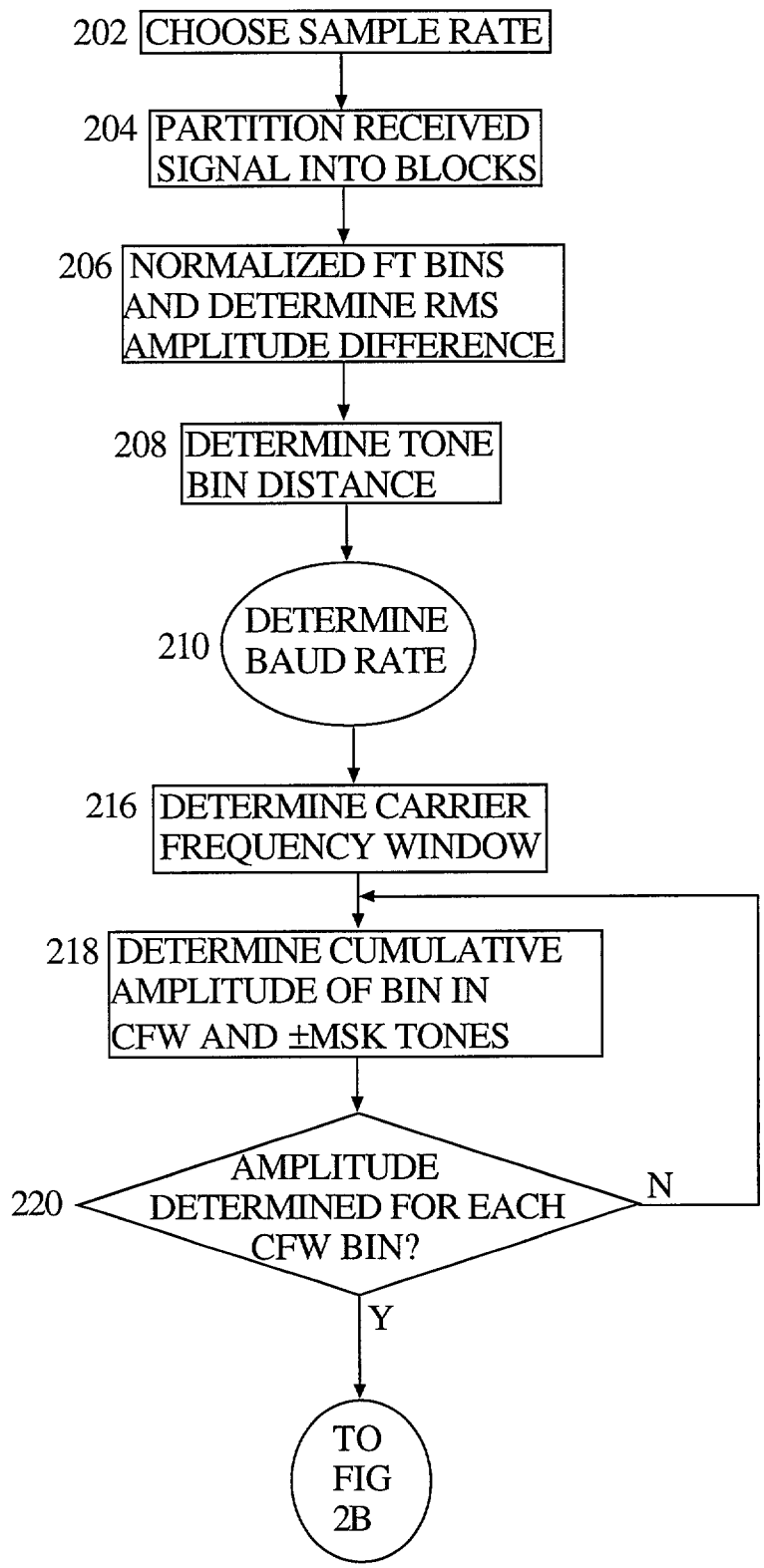
FIGS. 2A through 2E are a flow chart indicating the major steps for detecting a signal according to the present invention (FIGS. 2A and 2B) and the major steps for estimating characteristics of a signal according to the present invention (FIGS. 2C through 2D).
Figure 2B:
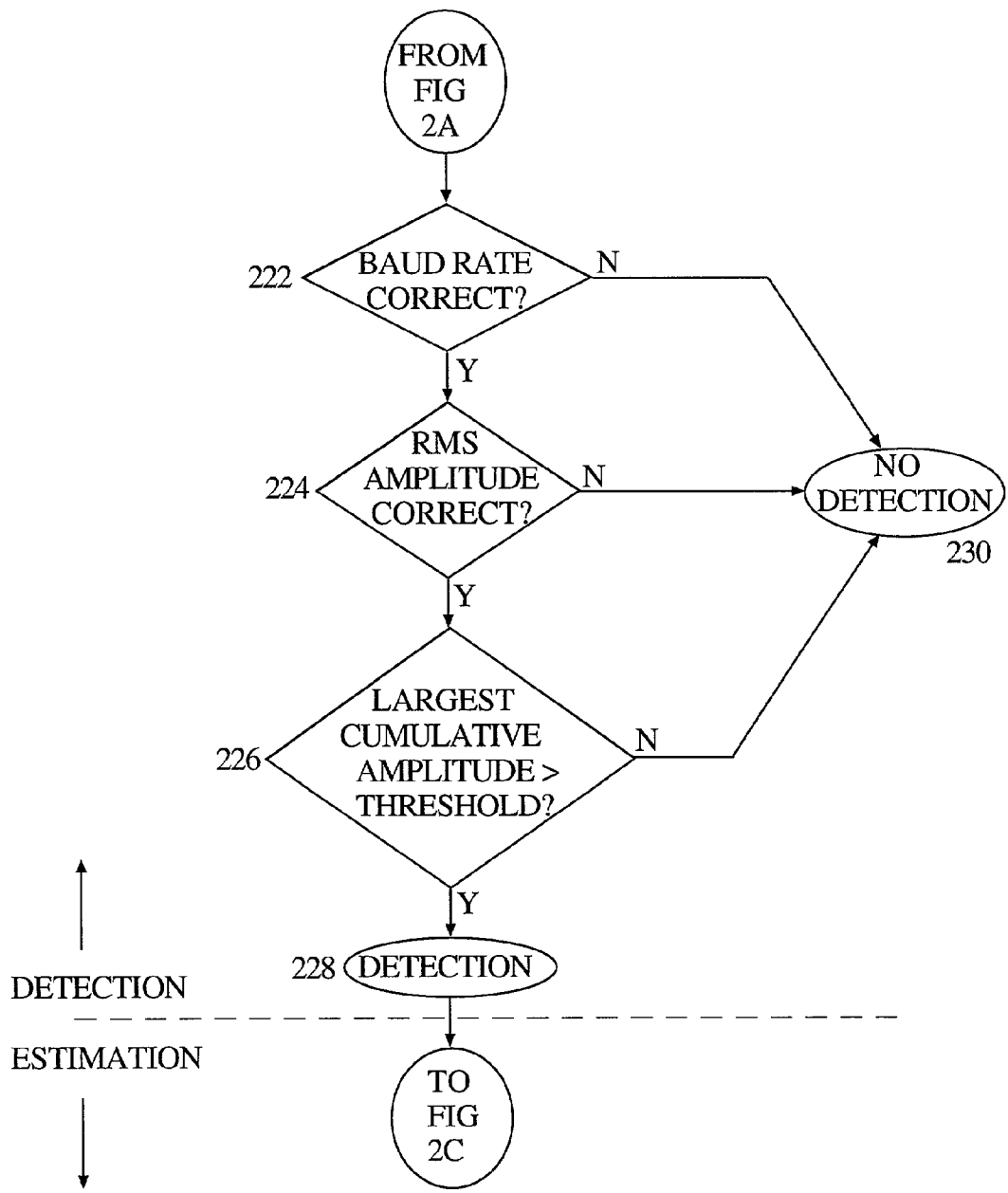

With reference now to FIGS. 2A and 2B, a flow chart is depicted showing the major steps for detection of a CPM waveform with an MSK preamble. At the step 202, a sample rate is chosen. Since the symbol rate and maximum allowable carrier offset for the incoming signal is unknown at the time of detection, the sample rate that is chosen must be high enough to allow for (a) the maximum allowable carrier frequency excursion as well as (b) the MSK characteristic tones from the MSK preamble. The MSK tones are typically spaced apart by the baud rate, which for an MSK preamble of the form $[(1 \cdot n),(0 \cdot n)]^m$, where n=2, i.e., a preamble of the form 1,1,0,0,1,1,0,0, . . . , is the symbol rate divided by 4. Generally, the baud rate equals the symbol rate divided by 2n. For example, for an MSK preamble with a 28,000 symbols/sec symbol rate and a ±1500 Hz maximum allowable carrier offset, a sample rate of 64,000 complex samples/sec (e.g. I and Q samples) will provide a good initial frequency estimate for the incoming signal. It is to be understood that the above example is not intended to limit the present invention in any manner but rather is included to assist in the understanding of the invention.

During the step 204 partitions the incoming signal into data blocks each containing a predetermined number of samples. One useful partitioning of samples is 256 samples per block, since 256 is a power of 2, although other block sizes are also contemplated by the present invention. As shown in FIG. 1, the incoming signal 10 is partitioned into N blocks of S samples.

At the step 206, the FT bins are normalized by any means known in the art, such as: $[I^2+Q^2]^{1/2}$; or adding the larger of I or Q to ½ of Q or ½ of I, respectively, so that the sum of the amplitudes of all the samples divided by the bin size is unity. There can be any number of bins for the FT, consistent with the discussion above for computation intensity and resolution. For a block size of 256 samples/block, a preferable number of FT bins is 256. Alternative numbers of bins are contemplated by the present invention. Therefore, for a sampling rate of 64,000 samples/sec and 256 bins, the bin size, or frequencies (or samples) per bin, is 250. It is preferable, though not required, to choose the sample rate such that the allowable symbol rates for the incoming signal all appear as an exact integer multiple of the bin size, Hz/bin. As would be known to those of skill in the art, the FT used would typically be a complex FT, although other types of FT are also contemplated by the present inventive system and method. The RMS amplitude difference between the samples in a first portion of data Block 1 and the samples in a second portion of data Block 1 is also determined. The first portion of data Block 1 comprises those samples in data Block 1 that are not included in FT1. The second portion of data Block 1 comprises those samples in data Block 1 that are included in FT1. The RMS amplitude difference will be used later as one indication of detection of the incoming signal.

At the step 208, the Tone Bin Distance ("TBD") is determined. The TBD is the number of bins between the MSK tones as determined by the baud rate. The TBD is approximately equal to the baud rate (samples/sec, or Hz) divided by the bin size (Hz/bin). The TBD will be used, as discussed below, to determine a cumulative amplitude which is used as one indication of detection of the incoming signal. A first FT, FT1 in FIG. 1, is performed on the first data block, Block 1 in FIG. 1, that typically contains the initial energy of the incoming signal. The FT1 is performed by any means known in the art. If the signal does not appear in the Block 1, the FT1 is discarded, along with the samples in the Block 1, and the FT2 performs the same tasks as would have FT1. Therefore, the procedure can be regarded as Block 1 is the block of data within which the incoming signal 10 appears.

At the step 210, the baud rate of the incoming signal is determined. The baud rate may be determined by sorting the bins of FT1 in amplitude order, designating a set of the largest amplitude bins as containing the MSK tones, and determining the closest bin distance (by the difference in bin numbers) between any two of the adjacent MSK tone bins. Typically, the three or five bins with the largest amplitudes are designated as the MSK tones, although other numbers of bins are contemplated. For example, if the five bins with the largest amplitudes, sorted in amplitude order, are bin 0, bin 253, bin 4, bin 9, and bin 248, the closest bin distance between any two of the bins is 3 bins between bin 0 and bin 253. The baud rate can then be determined by the closest bin distance (number of bins) and the bin size (samples/bin). If the determined baud rate is approximately equal to an expected symbol rate divided by 2n, then there is possible signal detection, as will be discussed further below. Once the baud rate is determined, the bandwidth of the incoming signal can be determined by techniques known in the art, and a variable bandwidth filter can be adjusted so as to take advantage of the knowledge of the bandwidth of the incoming signal.

With reference now to the step 216, a Carrier Frequency Window ("CFW") is determined. The CFW contains a number of bins as a function of the maximum allowable carrier offset. For example, if the maximum allowable carrier offset is ±1500 Hz, and the bin size (as determined above) is 250 Hz/bin, then a Carrier Bin Offset ("CBO") is 6 bins. The CFW is comprised of the zero bin offset, bin 0, plus those bins that are one CBO greater than and one CBO less than bin 0. For this example, the CFW is shown below:

| BIN 250 | BIN 251 | BIN 252 | BIN 253 | BIN 254 | BIN 255 | BIN 0 | BIN 1 | BIN 2 | BIN 3 | BIN 4 | BIN 5 | BIN 6 |
|---------|---------|---------|---------|---------|---------|-------|-------|-------|-------|-------|-------|-------|
|         |         |         |         |         |         |       |       |       |       |       |       |       |

The above example is for illustrative purposes only and is not to be construed as limiting the invention in any way.

With attention now drawn to the steps 218 and 220, the cumulative amplitude of each bin in the CFW, including the amplitudes of the ±MSK tone for each respective bin, is determined. The use of the amplitudes of just the bins in the CFW does not result in a sufficiently low error rate to be useful. Therefore, the amplitudes of the respective ±MSK tones are added in to allow for a more robust detection algorithm. The present invention contemplates determining the cumulative amplitude of the CFW bin and the ±1 MSK tones as well as determining the cumulative amplitude of the CFW bin and the ±1 and ±2 MSK tones.

As an example, assume that the CFW is as shown above (where the maximum allowable carrier offset is ±1500 Hz), for a FT with 256 bins, and a TBD of 28 bins (as determined from a baud rate of 7000 Hz divided by a bin size of 250 Hz/bin). The TBD of 28 indicates that an MSK tone should appear every 28 bins from bin 0, i.e., bins 28 and 228, 56 and 200, 84 and 172, etc. Therefore, for this example, in determining the cumulate amplitude for each of the bins in the CFW, including the ±1 MSK tones, the amplitudes of the following bins (row wise) would be added together:

| Bin # of Bin in CFW | Bin # of −1 MSK Tone | Bin # of +1 MSK Tone |
|---------------------|----------------------|----------------------|
| 250 | 222 | 22 |
| 251 | 223 | 23 |
| 252 | 224 | 24 |
| 253 | 225 | 25 |
| 254 | 226 | 26 |
| 255 | 227 | 27 |
| 0   | 228 | 28 |
| 1   | 229 | 29 |
| 2   | 230 | 30 |
| 3   | 231 | 31 |
| 4   | 232 | 32 |
| 5   | 233 | 33 |
| 6   | 234 | 34 |

It shall be understood by those of skill in the art that the above example is illustrative only and that the procedure exemplified can be applied to other assumed values.

Alternatively, the determination of the cumulative amplitude can include the bins immediately adjacent to the CFW and/or the bins adjacent to the ±1 MSK tones and/or the bins adjacent to the ±2 MSK tones (if the bins for the ±2 MSK tones are used in calculating the cumulative amplitude. The use of the adjacent bins is useful in the event the carrier frequency is located at the edge of a bin. As an example, the cumulative amplitude can be determined for each of the bins in the CFW, including the ±1 MSK tones, and the adjacent bins for both the bins in the CFW and the ±1 MSK tones by adding the amplitudes of the following bins (row wise):

| Bin # of Bin in CFW | Adjacent Bins | Bin # of −1 MSK Tone | Adjacent Bins | Bin # of +1 MSK Tone | Adjacent Bins |
|---------------------|---------------|----------------------|---------------|----------------------|---------------|
| 250 | 249, 251 | 222 | 221, 223 | 22 | 21, 23 |
| 251 | 250, 252 | 223 | 222, 224 | 23 | 22, 24 |
| 252 | 251, 253 | 224 | 223, 225 | 24 | 23, 25 |
| 253 | 252, 254 | 225 | 224, 226 | 25 | 24, 26 |
| 254 | 253, 255 | 226 | 225, 227 | 26 | 25, 27 |
| 255 | 254, 0   | 227 | 226, 228 | 27 | 26, 28 |
| 0   | 255, 1   | 228 | 227, 229 | 28 | 27, 29 |
| 1   | 0, 2     | 229 | 228, 230 | 29 | 28, 30 |
| 2   | 1, 3     | 230 | 229, 231 | 30 | 29, 31 |
| 3   | 2, 4     | 231 | 230, 232 | 31 | 30, 32 |
| 4   | 3, 5     | 232 | 231, 233 | 32 | 31, 33 |
| 5   | 4, 6     | 233 | 232, 234 | 33 | 32, 34 |
| 6   | 5, 7     | 234 | 233, 235 | 34 | 33, 35 |

With reference now to FIG. 2B, specifically to the steps 222, 224, and 226, a determination of whether the incoming signal is detected is made. In order to show detection of the signal:

1. at the step 222, the baud rate as determined in the step 210 must be equal to approximately a known symbol rate for the incoming signal divided by 2n where n defines the MSK preamble $[(1 \cdot n),(0 \cdot n)]^m$;
2. at the step 224, the FT window does not experience a large change of amplitude as determined by the difference in RMS amplitude from the step 212; and
3. at the step 226, the largest cumulative amplitude from the steps 218 and 220 less than a predetermined threshold.

At the step 228, if all three of the above tests are passed, the incoming signal has been detected. If any of the above tests are not passed, there is no detection, as indicated at the step 230.

Figure 2C:
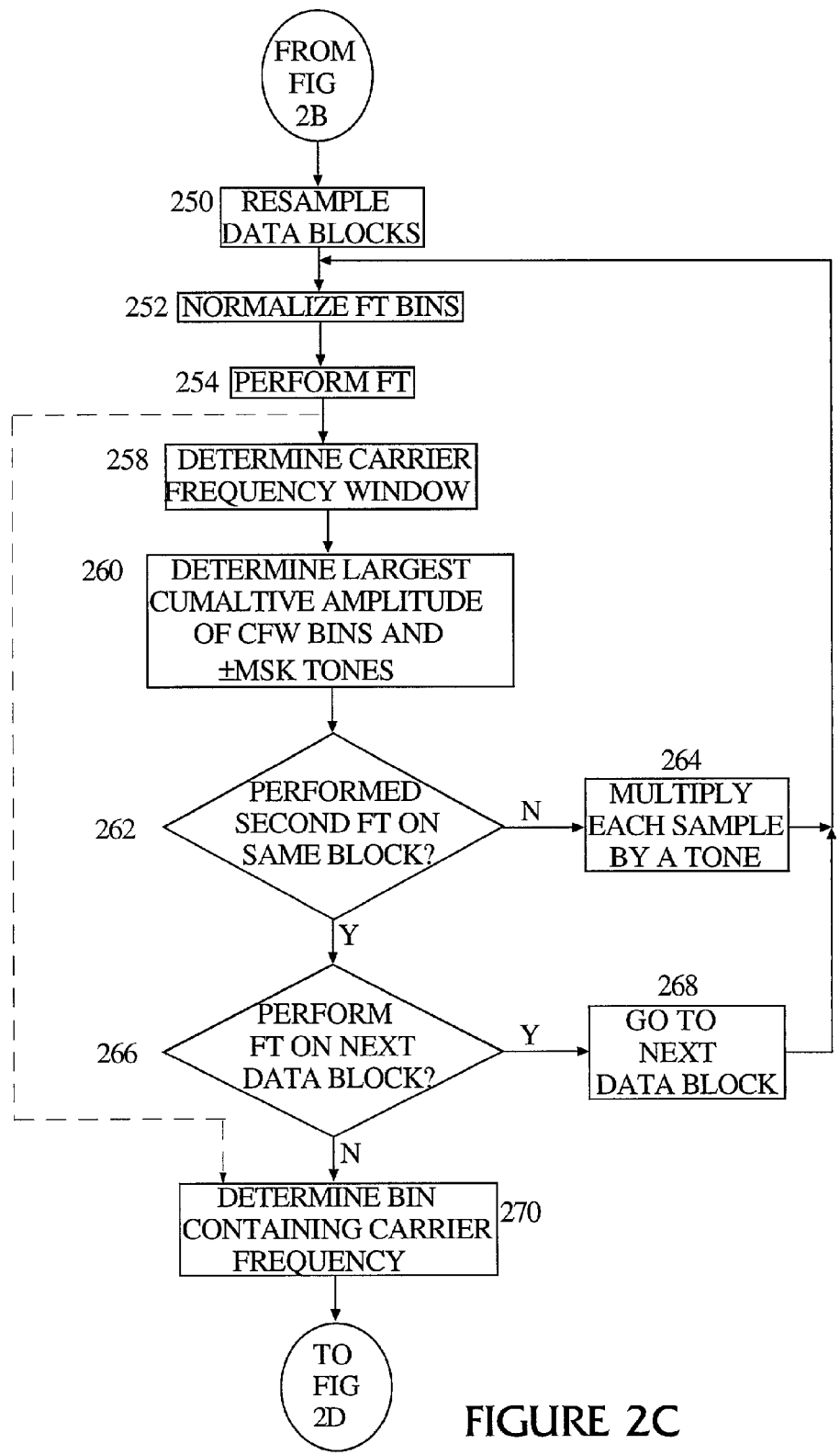
Figure 2D:
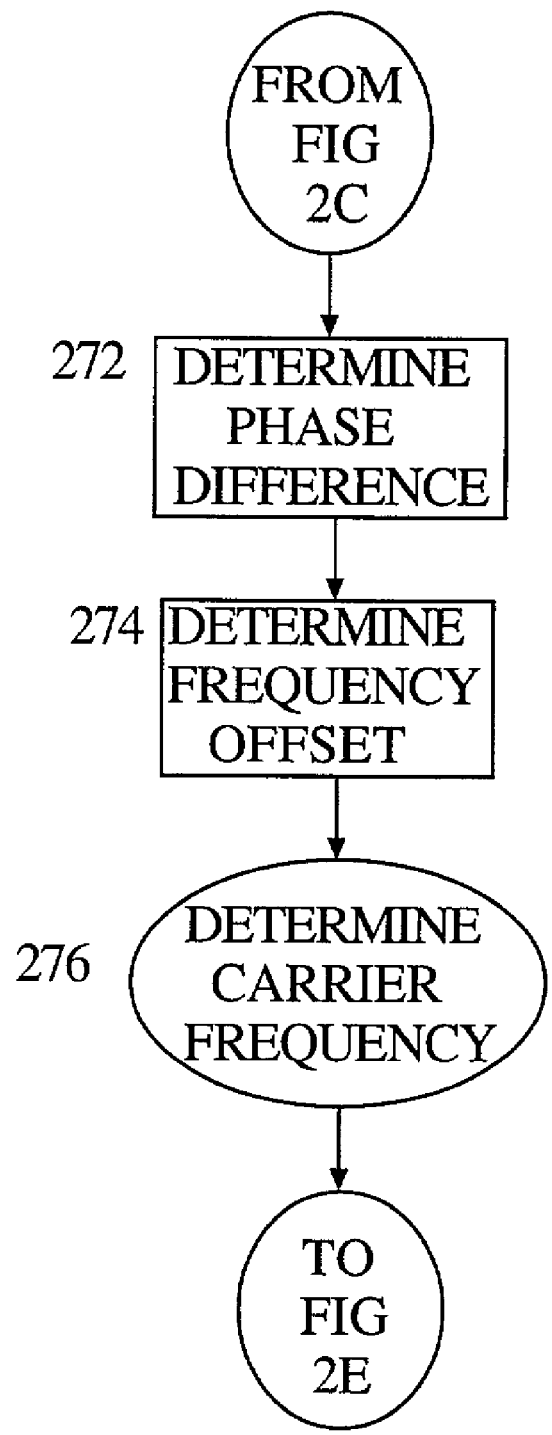

With attention now to FIGS. 2C and 2D, the flow chart from FIGS. 2A and 2B is continued. FIGS. 2C and 2D depict the major steps for determining certain characteristics of a CPM waveform with an MSK preamble. Alternatively, the procedure depicted in FIGS. 2C and 2D can be performed independently from the detection procedures in FIGS. 2A and 2B, so long as the incoming waveform has been detected.

At the step 250 in FIG. 2C, the data blocks of the incoming signal, e.g., the incoming signal 10 in FIG. 1, are resampled at a predetermined resampling rate that is preferentially greater than the sampling rate chosen in the step 202. In one embodiment, the blocks of data that are resampled are the last half of the block in which the incoming signal 10 appears and enough of the remaining data blocks after that point for completing the determination of the waveform characteristics of the incoming signal. Typically, this is at least 2 data blocks, as shown in FIG. 1. Preferentially, the resampling rate is 2n where n, the symbol repetition factor, is from the aforementioned general equation for the MSK preamble $[(1 \cdot n),(0 \cdot n)]^m$. However, the resampling rate may be any reasonable rate as contemplated by the invention. The resampling changes the time base of the data in the data blocks.

The resample rate is preferentially a multiple of the MSK signal symbol rate. For example, if there are four samples per symbol in the radio and using the previous example of an MSK preamble with a 28,000 symbols/sec rate, the resample rate would preferentially be 112,000 samples/sec. By requiring that the resample rate be an integer multiple of the symbol rate removes the MSK tone "walking" phenomenon, which is caused by boundary effects of the FT bins. Prior art solutions to this problem incorporate the use of FT "windows" to overcome the MSK tone "walking" phenomenon. However, FT "windowing" degrades the signal energy. The tying of the resample rate to an integer multiple of the symbol rate has the additional benefit of filtering out out-of-band noise and thus improving the signal-to-noise ratio of the received signal.

With reference now to the steps 252 through 268, loops in the procedure occur for taking FT3, FT4, and FT5, which are shown in FIG. 1. The operations performed in the steps 252, 254, and 258 correspond to the operations performed on the steps 206, 208, and 216 and will not be discussed further here. The step 260 corresponds to the step 218 with the insertion of the substep of determining the largest cumulative amplitude for the FT for which the loop is currently being run. The step 262 is a decision step to determine when FT4 will be run. For example, during the first pass through the loop, FT3 is taken on the resampled data Block 3 of FIG. 1. As previously discussed for FIG. 1, another FT, FT4, will be taken on resampled data Block 3 after the samples have been multiplied by a tone in the step 264: $\exp(j\omega/s)$ where "$\omega$" is the frequency and "s" is the resampled rate, then FT4 is taken on the modified resampled data Block 3. Preferably, the tone shifts the data in resampled Block 3 by ½ the bin spacing, although other shifts of the data may be used as appropriate. After the loop of the steps 252 through 260 is repeated for FT4, the step 262 is answered in the affirmative thereby opening the path to the step 266. If an FT is to be performed on the next data block, which it will for FT5, the step 268 increments the next block of data and FT5 is performed. Note that FT5 is not performed on samples that have been multiplied by the tone $\exp(j\omega/s)$. The loop can be repeated as many times as necessary in order to obtain the data required for determining the characteristics of the incoming signal, as discussed further below.

Alternatively, since ideally FT5 does not need to pass through all the steps in the loop, the only steps in the loop that need to be performed for FT5 are the normalizing, step 252, and the performing the FT, step 254. This is indicated in FIG. 2C by the dotted line between the step 254 and the step 270.

With reference now to the step 270, the bin containing the carrier frequency is determined from the bins of FT3 and FT4. The bin with the largest cumulative amplitude from FT3 and FT4 is the bin that contains the carrier frequency. The center frequency of the bin that contains the carrier frequency is the carrier frequency estimate.

With attention now directed at FIG. 2D, the carrier frequency estimate from the step 270 must be refined by determining a phase difference in the step 272 and a frequency offset in the step 274.

At the step 272, the phase difference is determined between the phase value of the carrier frequency bin and the phase value of the bin from FT5 that has the same bin number as the carrier frequency bin. This phase difference corrects for the FT frequency which is not located at the exact center of the FT bin. At the step 274, the frequency offset is determined by dividing the phase difference in the step 272 by the time duration of one of the FTs. At the step 276, the carrier frequency is determined by adding the frequency offset from the step 274 to the carrier frequency estimate from the step 270.

Figure 2E:
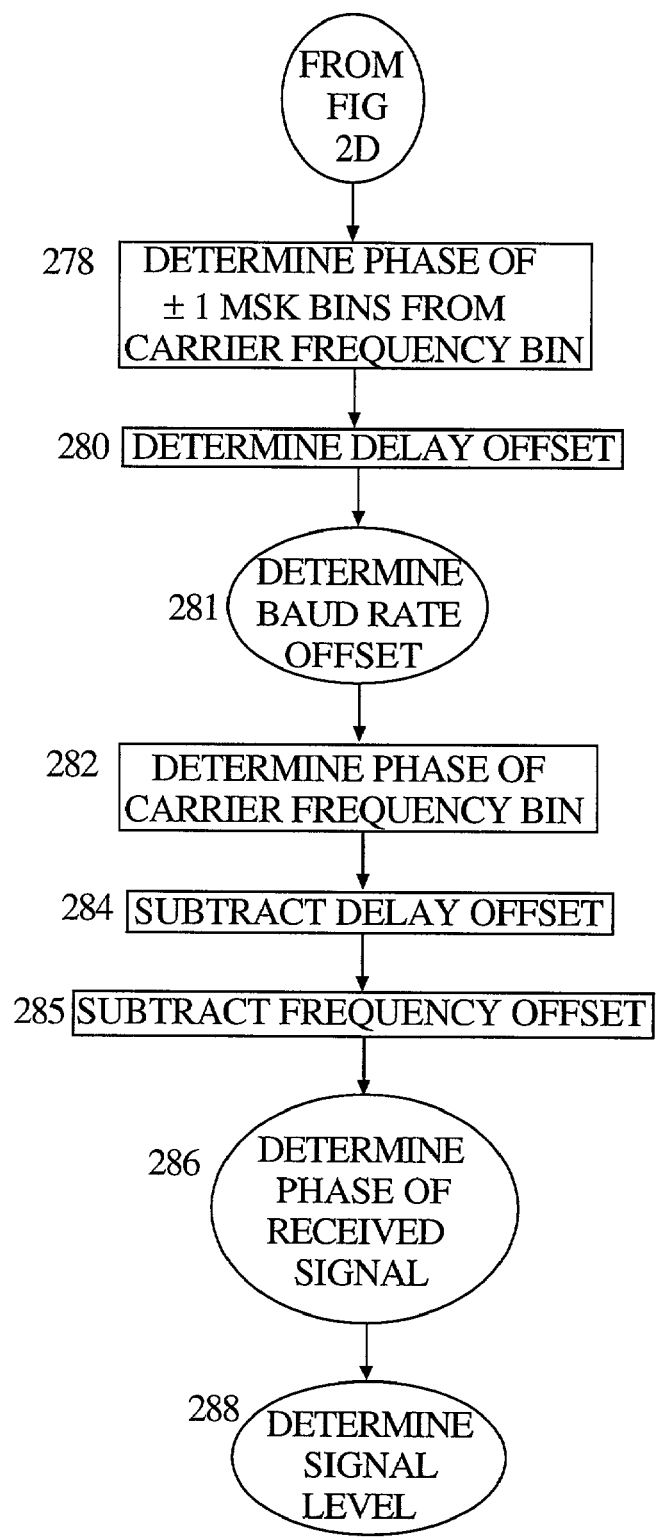

With reference now to FIG. 2E, the phase and timing of the incoming signal will now be determined from the steps 278 through 286. At the step 278, the phase of the bins containing the ±1 MSK tones for the carrier frequency bin is determined. One method of determining the phase is by taking arctan(Q/I) for these bins, although any method for determining phase can be used. At the step 280, a delay offset is determined by calculating the difference in phase between the ±1 MSK bins and dividing the difference in phase by the bin distance between the ±1 MSK tones, which may be the same as twice the TBD. At the step 281, the baud rate offset is determined, by any method known in the art. The baud rate offset is a timing offset which is used to determine where the FT started with respect to the start of the preamble. At the step 282, the phase of the carrier frequency bin is determined by known methods and at the step 284, a modified phase for the carrier frequency bin is determined by subtracting the delay offset determined in the step 280 from the phase of the carrier frequency bin determined in the step 282. At the step 285, the frequency offset calculated in the step 274 is subtracted from the modified phase for the carrier frequency bin determined in the step 284 to thereby determine the phase of the incoming signal at the step 286. With reference now to the step 288, the signal level of the incoming signal is determined from the gain values from one of the FT bin normalizing steps. Accordingly, the frequency, phase, and signal level characteristics of the incoming signal are determined.

Figure 3:
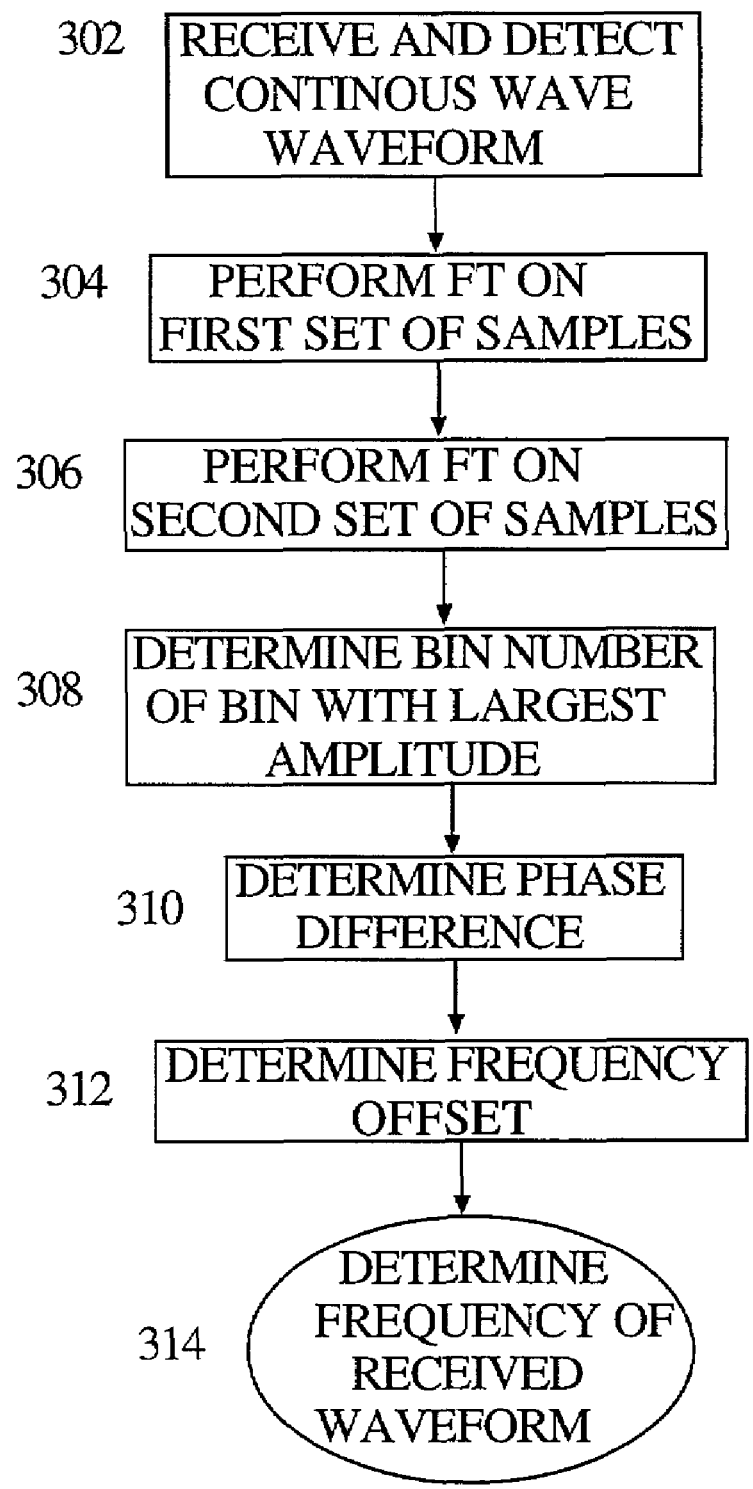
FIG. 3 is a flow chart indicating the major steps in determining the frequency of a received continuous wave waveform according to the present invention.

With attention now drawn to FIG. 3, the present inventive system and method can also be used to determine, by the use of contiguous Fourier Transforms, the frequency of a received and detected continuous wave ("CW") waveform. At the step 302, the CW waveform is received and detected by any means known in the art. At the step 304, a first FT is performed on a first set of samples. At the step 306, a second FT is performed on a second set of samples where the first and second set of samples are contiguous, as are the first and second FTs. At the step 308, the bin number of the bin with the largest amplitude, from both the first and second FTs, is determined. At the step 310, a phase difference is determined between the phase values for the bin with the largest amplitude, as determined in the step 308, and the bin with the same bin number as the largest amplitude bin but is from the FT that does not contain the bin with the largest amplitude. At the step 312, a frequency offset is determined by dividing the phase difference determined in the step 310 by the time duration of one FT. At the step 314, the frequency of the CW waveform is determined by adding the frequency offset determined in the step 312 to the center frequency for the bin with the largest amplitude determined in the step 308.

It can be seen by those of skill in the art that the carrier frequency of a CPM waveform with a MSK preamble can be determined by information derived from contiguous FT blocks.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A method for detecting at a receiver a continuous phase modulation ("CPM") waveform signal transmitted by a transmitter, wherein said CPM waveform:
   (A) has a known maximum allowable carrier frequency offset,
   (B) comprises a pattern of binary tones comprising a predetermined number of a first binary tone followed by a predetermined number of a second binary tone, the pattern repeating a predetermined number of times,
   (C) has a symbol rate that is one of a predetermined number of known symbol rates,
   (D) is received and sampled at a predetermined sample rate,
   wherein said method of detecting uses Fourier Transforms ("FTs") containing a predetermined number of bins N such that each bin comprises a predetermined number of frequencies, said method comprising the steps of:
   (a) partitioning the received CPM waveform signal into blocks such that each block comprises a predetermined number of samples;
   (b) normalizing the predetermined number of bins N of the FTs;
   (c) performing a FT on a first one of said blocks to thereby generate a set of FT bins;
   (d) determining a baud rate of the received CPM waveform;
   (e) determining the difference in Root Mean Square ("RMS") amplitude between the samples in a first portion of said first one of said blocks and the samples in a second portion of said first one of said blocks;
   (f) determining a Tone Bin Distance ("TBD") as a number of bins as a function of said baud rate;
   (g) determining a Carrier Frequency Window ("CFW") containing a predetermined number of bins N of said set of FT bins including a bin zero;
   (h) determining, for each bin in said CFW, a largest cumulative amplitude of:
      (1) said each bin in the CFW;
      (2) the bin one TBD greater than said bin in the CFW;
      (3) the bin one TBD less than said bin in the CFW; and
   (i) determining that:
      (1) the baud rate determined in step (d) is approximately the symbol rate divided by twice a symbol repetition factor of one of said predetermined number of known symbol rates,
      (2) the RMS amplitude difference determined in step (e) is less than a first predetermined threshold, and
      (3) the largest cumulative amplitude value from step (h) is greater than a second predetermined threshold, to thereby detect said CPM waveform at the receiver.

2. The method of claim 1 wherein the step of normalizing the predetermined number of bins of the FTs is accomplished such that the sum of the amplitudes of all the samples divided by the number of bins is unity.

3. The method of claim 1 wherein said FT starts after the first sample in said first one of said blocks.

4. The method of claim 3 wherein said FT starts at approximately the middle sample of said first one of said blocks.

5. The method of claim 4 wherein the step of determining the RMS amplitude is accomplished such that said first portion comprises the samples in said first one of said blocks prior to the start of said FT and said second portion comprises the remaining samples of said first one of said blocks.

6. The method of claim 1 wherein the step of determining the baud rate of the CPM waveform is accomplished by: (1) sorting by amplitude said set of FT bins; (2) determining a first set of at least three bins of said sorted FT bins wherein each bin of said first set has an amplitude greater than the amplitude of each of the bins in said sorted FT bins that is not in said first set; and (3) determining the closest bin distance between any two adjacent bins in said first set of bins to thereby determine the baud rate of the received signal.

7. The method of claim 1 wherein said TBD is approximately equal to the baud rate divided by said predetermined number of frequencies per bin.

8. The method of claim 1 wherein the step of determining the CFW is accomplished by: (1) determining a Carrier Bin Offset ("CBO") as a predetermined number of bins derived from said maximum allowable carrier frequency offset; (2) determining a second set of bins of said set of FT bins comprising bin 1 through the bin number of the bin that is one CBO larger than bin zero, inclusive; (3) determining a third set of bins of said set of FT bins comprising bin N through the bin number that is one greater than one CBO less than bin N, inclusive; and (4) designating bin zero and said second and third sets of bins as the CFW.

9. The method of claim 8 wherein said CBO is approximately equal to said maximum allowable carrier frequency offset divided by said predetermined number of frequencies per bin.

10. The method of claim 1 wherein step (h) includes the additional substep of: (4) the bin on either side of said each bin in the CFW.

11. The method of claim 1 wherein step (h) includes the additional substep of: (4) the bin on either side of the bin one TBD greater than said bin in the CFW.

12. The method of claim 1 wherein step (h) includes the additional substep of: (5) the bin on either side of the bin one TBD less than said bin in the CFW.

13. The method of claim 1 wherein said predetermined number of tones is two.

14. The method of claim 1 wherein said predetermined number of tone is greater than two.

15. The method of claim 1 wherein the Fourier Transform ("FT") is a Discrete Fourier Transform ("DFT").

16. The method of claim 1 wherein the Fourier Transform ("FT") is a Fast Fourier Transform ("FFT").

17. The method of claim 1 wherein the CPM waveform is a minimum shift keyed waveform.

18. The method of claim 1 wherein the sample rate chosen in step (b) is greater than the highest expected bandwidth of the received signal.

19. The method of claim 18 wherein the sample rate is chosen so that the known allowable symbol rates for the received signal are each an integer multiple of the bin size measured in Hz/bin.

20. A method for determining at a receiver a characteristic of a received and detected continuous phase modulation ("CPM") waveform signal transmitted by a transmitter, wherein said received and detected CPM waveform:
   (A) has a known maximum allowable carrier frequency offset,
   (B) comprises a pattern of binary tones comprising a predetermined number of a first binary tone followed by a predetermined number of a second binary tone, the pattern repeating a predetermined number of times,
   (C) has a known baud rate, (D) is resampled at a predetermined resample rate, wherein said method of determining uses Fourier Transforms ("FTs") containing a predetermined number of bins N such that each bin comprises a predetermined number of frequencies, said method comprising the steps of:
(a) partitioning the received signal into blocks such that each block comprises a predetermined number of samples;
(b) performing the following steps for a first one of said blocks:
  (1) normalizing the bins of the FT;
  (2) performing a FT to thereby generate a set of FT bins;
  (3) determining a Tone Bin Distance ("TBD") as a number of bins as a function of said baud rate;
  (4) determining a Carrier Frequency Window ("CFW") containing a predetermined number of bins of a set of FT bins including a bin zero;
  (5) determining, for each bin in said CFW, a cumulative amplitude of:
    (i) said predetermined number of bins in the CFW;
    (ii) the bin one TBD greater than said bin in the CFW;
    (iii) a bin one TBD less than said predetermined number of bins in the CFW; and
  (6) determining the largest cumulative amplitude from step (5);
(c) multiplying each sample of said first one of said blocks by a tone with a predetermined value to thereby form a modified block;
(d) repeating steps (b) (1) through (b) (6) for said modified block;
(e) repeating steps (b) (1) through (b) (2) for a second one of said blocks wherein said second one of said blocks is contiguous with said first one of said blocks;
(f) determining the larger of the cumulative amplitudes from step (b) (6) for the FT for said first one of said blocks and the FT for said modified block;
(g) determining the carrier frequency from the center frequency of the predetermined number of bins in the CFW for the FT with the larger cumulative amplitude determined in step (f);
(h) determining a phase difference between the phase value of the carrier frequency bin in step (g) and the phase value of the predetermined number of bins from the set of FT bins from step (e) that has the same bin number as said carrier frequency bin;
(i) dividing said phase difference by the time duration of one FT to thereby determine a frequency offset; and
(j) adding said frequency offset to said carrier frequency to thereby determine the frequency of said received and detected CPM waveform.

21. The method of claim 20 wherein said TBD is approximately equal to the baud rate divided by said predetermined number of frequencies per bin.

22. The method of claim 20 wherein the step of determining the CFW is accomplished by:
(1) determining a Carrier Bin Offset ("CBO") as a predetermined number of bins derived from said maximum allowable carrier frequency offset;
(2) determining a second set of bins of said set of FT bins comprising bin 1 through the bin number of the bin that is one CBO larger than bin zero, inclusive;
(3) determining a third set of bins of said set of FT bins comprising bin N through the bin number that is one greater than one CBO less than bin N, inclusive; and
(4) designating bin zero and said second and third sets of bins as the CFW.

23. The method of claim 22 wherein said CBO is approximately equal to said maximum allowable carrier frequency offset divided by said predetermined number of frequencies per bin.

24. The method of claim 20 wherein step (b) (5) includes the additional substep of:
(iv) the bin on either side of said bin in the CFW.

25. The method of claim 20 wherein step (b) (5) includes the additional substep of:
(iv) the bin on either side of the bin one TBD greater than said bin in the CFW.

26. The method of claim 25 wherein step (b) (5) includes the additional substep of:
(v) the bin on either side of the bin one TBD less than said bin in the CFW.

27. The method of claim 20 wherein the predetermined value for the tone in step (c) is equal to one-half the bin spacing for the FT.

28. The method of claim 20 wherein said predetermined number of tones is two.

29. The method of claim 20 wherein said predetermined number of tone is greater than two.

30. The method of claim 20 wherein the Fourier Transform ("FT") is a Discrete Fourier Transform ("DFT").

31. The method of claim 20 wherein the Fourier Transform ("FT") is a Fast Fourier Transform ("FFT").

32. The method of claim 20 wherein the CPM waveform is a minimum shift keyed waveform.

33. The method of claim 20 further comprising the steps of:
(k) determining the phase of the bin one TBD greater than said carrier frequency bin and one TBD less than said carrier frequency bin from the set of FT bins of which the carrier frequency bin is a member;
(l) calculating a delay offset by determining the difference in phase between the phases of the bins calculated in step (k) and dividing said difference in phase by two TBD;
(m) determining the phase of said carrier frequency bin;
(n) subtracting said delay offset from the phase of said carrier frequency bin to thereby determine a modified phase of the carrier frequency bin; and
(o) subtracting said frequency offset from said modified phase of the carrier frequency bin to thereby determine the phase of said received and detected CPM waveform.

34. The method of claim 33 wherein said predetermined number of tones is two.

35. The method of claim 33 wherein said predetermined number of tone is greater than two.

36. The method of claim 33 wherein the Fourier Transform ("FT") is a Discrete Fourier Transform ("DFT").

37. The method of claim 33 wherein the Fourier Transform ("FT") is a Fast Fourier Transform ("FFT").

38. The method of claim 33 wherein the CPM waveform is a minimum shift keyed waveform.

39. The method of claim 20 further comprising the steps of: (k) determining the gain values from the normalizing function in step (b) (1) to thereby determine the signal level of the received waveform.

40. The method of claim 39 wherein said predetermined number of tones is two.

41. The method of claim 39 wherein said predetermined number of tone is greater than two.

42. The method of claim 39 wherein the Fourier Transform ("FT") is a Discrete Fourier Transform ("DFT").

43. The method of claim 39 wherein the Fourier Transform ("FT") is a Fast Fourier Transform ("FFT").

44. The method of claim 39 wherein the CPM waveform is a minimum shift keyed waveform.

45. A method for acquiring at a receiver a continuous phase modulation ("CPM") waveform signal transmitted by a transmitter, wherein said CPM waveform:
  (A) has a known maximum allowable carrier frequency offset,
  (B) comprises a pattern of binary tones comprising a predetermined number of a first binary tone followed by a predetermined number of a second binary tone, the pattern repeating a predetermined number of times,
  (C) has a symbol rate that is one of a predetermined number of known symbol rates,
  (D) is received and sampled at a predetermined sample rate, wherein said method of acquiring uses Fourier Transforms ("FTs") containing a predetermined number of bins N such that each bin comprises a predetermined number of frequencies, said method comprising the steps of:
  (a) partitioning the received signal into blocks such that each block comprises a predetermined number of samples;
  (b) normalizing the bins of the FTs;
  (c) performing a FT on a first one of said blocks to thereby generate a set of first block FT bins;
  (d) determining a baud rate of the received CPM waveform;
  (e) determining the difference in RMS amplitude between the samples in a first portion of said first one of said blocks and the samples in a second portion of said first one of said blocks;
  (f) determining a Tone Bin Distance ("TBD") as a number of bins as a function of said baud rate;
  (g) determining a Carrier Frequency Window ("CFW") containing a predetermined number of bins of said set of first block FT bins including a bin zero;
  (h) determining, for each bin in said CFW, a cumulative amplitude of:
    (1) said predetermined number of bins in the CFW;
    (2) a bin one TBD greater than said predetermined number of bins in the CFW; and
    (3) a bin one TBD less than said bin in a CFW;
  (i) determining that:
    (1) the baud rate determined in step (d) is approximately the symbol rate divided by twice the symbol repetition factor of one of said predetermined number of known symbol rates,
    (2) the RMS amplitude variance determined in step (e) is less than a first predetermined threshold, and
    (3) the largest cumulative amplitude value from step (h) is greater than a second predetermined threshold to thereby detect said CPM waveform at the receiver;
  (j) resampling said blocks at a predetermined resampling rate;
  (k) performing the following steps for said resampled third one of said blocks:
    (1) normalizing the bins of the FTs;
    (2) performing a FT to thereby generate a set of FT bins;
    (3) determining a Tone Bin Distance ("TBD") as a number of bins as a function of said baud rate;
    (4) determining a Carrier Frequency Window ("CFW") containing a predetermined number of bins of said set of FT bins including a bin zero;
    (5) determining, for each bin in said CFW, the cumulative amplitude of: (i) said bin in the CFW; (ii) the bin one TBD greater than said bin in the CFW; (iii) a bin one TBD less than said bin in the CFW; and
    (6) determining the largest cumulative amplitude from step (5);
  (l) multiply each sample of said resampled third block by a tone with a predetermined value to thereby form a modified block;
  (m) repeating steps (k) (1) through (k) (6) for said modified block;
  (n) repeating steps (k) (1) through (k) (2) for a fourth one of said blocks resampled at said predetermined resampling rate wherein said fourth block is contiguous with said third block and the FT for said resampled fourth block is contiguous with the FT for said resampled third block;
  (o) determining the larger of the cumulative amplitudes from step (k) (6) for the FT for said resampled third one of said blocks and the FT for said modified block;
  (p) determining the carrier frequency from the center frequency of the bin in the CFW for the FT with the larger cumulative amplitude determined in step (o);
  (q) determining a phase difference between the phase value of the carrier frequency bin in step (j) and the phase value of the bin from the set of FT bins from step (n) that has the same bin number as said carrier frequency bin;
  (r) dividing said phase difference by the time duration of one FT to thereby determine a frequency offset;
  (s) adding said frequency offset to said carrier frequency to thereby determine the frequency of said received and detected CPM waveform,
  (t) determining the phase of the bin one TBD greater than said carrier frequency bin and one TBD less than said carrier frequency bin from the set of FT bins of which the carrier frequency bin is a member;
  (u) calculating a delay offset by determining the difference in phase between the phases of the bins calculated in step (t) and dividing said difference in phase by two TBD;
  (v) determining the phase of said carrier frequency bin;
  (w) subtracting said delay offset from the phase of said carrier frequency bin to thereby determine a modified phase of the carrier frequency bin;
  (x) subtracting said frequency offset from said modified phase of the carrier frequency bin to thereby determine the phase of said received and detected CPM waveform; and
  (y) determining the gain values from the normalizing function in step (b) to thereby determine the signal level of said received and detected waveform to thereby acquire at said receiver said continuous phase modulation ("CPM") waveform signal transmitted by said transmitter.

46. The method of claim 45 wherein each of said FTs starts after the first sample in its respective block.

47. The method of claim 46 wherein each of said FTs starts at approximately the middle sample of its respective block.

48. The method of claim 47 wherein the step of determining the RMS amplitude is accomplished such that said first portion comprises the samples in said first one of said blocks prior to the start of said FT and said second portion comprises the remaining samples of said first one of said blocks.

49. The method of claim 45 wherein the step of determining the baud rate of the CPM waveform is accomplished by: (1) sorting by amplitude said set of first block FT bins; (2) determining a first set of at least three bins of said sorted FT bins wherein each bin of said first set has an amplitude greater than the amplitude of each of the bins in said sorted FT bins that is not in said first set; and (3) determining the closest bin distance between any two adjacent bins in said first set of bins to thereby determine the baud rate of the received signal.

50. The method of claim 45 wherein said TBD is approximately equal to the baud rate divided by said predetermined number of frequencies per bin.

51. The method of claim 45 wherein determining the CFW in step (g) is accomplished by: (1) determining a Carrier Bin Offset ("CBO") as a predetermined number of bins derived from said maximum allowable carrier frequency offset; (2) determining a second set of bins of said set of first block FT bins comprising bin 1 through the bin number of the bin that is one CBO larger than bin zero, inclusive; (3) determining a third set of bins of said set of first block FT bins comprising bin N through the bin number that is one greater than one CBO less than bin N, inclusive; and (4) designating bin zero and said second and third sets of bins as the CFW.

52. The method of claim 51 wherein said CBO is approximately equal to said maximum allowable carrier frequency offset divided by said predetermined number of frequencies per bin.

53. The method of claim 45 wherein step (h) includes the additional substep of: (4) the bin on either side of said bin in the CFW.

54. The method of claim 45 wherein step (h) includes the additional substep of: (4) the bin on either side of the bin one TBD greater than said bin in the CFW.

55. The method of claim 54 wherein step (h) includes the additional substep of: (5) the bin on either side of the bin one TBD less than said bin in the CFW.

56. The method of claim 45 wherein the predetermined value for the tone in step (1) is equal to one-half the bin spacing for the FT for said resampled first one of said blocks.

57. The method of claim 45 wherein the Fourier Transform ("FT") is a Discrete Fourier Transform ("DFT").

58. The method of claim 45 wherein the Fourier Transform ("FT") is a Fast Fourier Transform ("FFT").

59. The method of claim 45 wherein the CPM waveform is a minimum shift keyed waveform.

60. The method of claim 45 wherein the sample rate chosen in step (b) is greater than the highest expected bandwidth of the received signal.

61. The method of claim 60 wherein the sample rate is chosen so that the known allowable symbol rates for the received signal are each an integer multiple of the bin size measured in Hz/bin.

62. The method of claim 45 wherein said maximum allowable carrier frequency offset is 1500 Hz.

63. The method of claim 45 wherein predetermined number of tones is greater than two.

64. The method of claim 45 wherein said predetermined number of tones is two.

65. The method of claim 64 wherein said predetermined number of bins is 256.

66. The method of claim 65 wherein said predetermined sample rate is 64,000 samples per second.

67. The method of claim 66 wherein said predetermined number of frequencies per bin is 250.

68. The method of claim 67 wherein the maximum known symbol rate is 28,000 symbols per second.

69. The method of claim 66 wherein said resampling rate is greater than said sampling rate.

70. The method of claim 69 wherein the resampling rate is equal to twice said predetermined number of tones.

71. A method of determining the frequency of a received and detected continuous wave waveform that was sampled at a predetermined sampling rate, wherein said method of determining uses Fourier Transforms ("FTs") containing a predetermined number of bins N such that each bin comprises a predetermined number of frequencies, said method comprising the steps of:
(a) performing a first Fourier Transform ("FT") on a first sequence of samples to thereby generate a first set of FT bins;
(b) performing a second FT on a second sequence of samples to thereby generate a second set of FT bins wherein the first and second sequences of samples are contiguous and the first FT and the second FT are contiguous;
(c) determining the bin number of the bin with the overall largest amplitude from said first and second set of FT bins;
(d) determining the phase difference between the phase values for the bins from said first and second set of FT bins that have the same bin number as the bin number determined in step (c);
(e) dividing said phase difference by the time duration of one FT to thereby determine a frequency offset;
(f) adding said frequency offset to the center frequency for the bin with the largest amplitude determined in step (c) to thereby determine the frequency of the received waveform.

72. The method of claim 71 wherein the continuous wave waveform is a continuous phase modulation ("CPM") waveform containing an alternating data sequence repeating at a fixed time interval.

73. The method of claim 72 wherein the CPM waveform is a minimum shift keyed waveform.

74. The method of claim 71 wherein said predetermined number of bins is 256.

75. The method of claim 74 wherein said predetermined sample rate is 64,000 samples per second.

76. The method of claim 75 wherein said predetermined number of frequencies per bin is 250.

77. A receiver for detecting a continuous phase modulation ("CPM") waveform signal transmitted by a transmitter, wherein said CPM waveform:
(A) has a known maximum allowable carrier frequency offset,
(B) comprises a pattern of binary tones comprising a predetermined number of a first binary tone followed by said predetermined number of a second binary tone, the pattern repeating a predetermined number of times,
(C) has a symbol rate that is one of a predetermined number of known symbol rates,
(D) is received and sampled at a predetermined sample rate,
wherein said receiver uses Fourier Transforms ("FTs") containing a predetermined number of bins N such that each bin comprises a predetermined number of frequencies, said receiver comprising:
(a) means for partitioning the received CPM waveform signal into blocks such that each block comprises a predetermined number of samples;
(b) means for normalizing the bins of the FTs;
(c) a FT circuit for performing a FT on a first one of said blocks to thereby generate a set of FT bins;
(d) means for determining a baud rate of the received CPM waveform;
(e) means for determining the difference in Root Mean Square ("RMSD") amplitude between the samples in a first portion of said first one of said blocks and the samples in a second portion of said first one of said blocks;
(f) means for determining a Tone Bin Distance ("TBD") as a number of bins as a function of said baud rate;
(g) means for determining a Carrier Frequency Window ("CFW") containing a predetermined number of bins of said set of FT bins including a bin zero;
(h) means for determining, for each bin in said CFW, the cumulative amplitude of:
  (1) said each bin in the CFW;
  (2) the bin one TBD greater than said bin in the CFW; and
  (3) the bin one TBD less than said bin in the CFW; and
(i) means for determining that:
  (1) the baud rate determined in step (d) is approximately one-quarter of one of said predetermined number of known symbol rates,
  (2) the RMS amplitude variance determined in step (e) is less than a first predetermined threshold, and
  (3) the largest cumulative amplitude value from step (h) is greater than a second predetermined threshold, to thereby detect said CPM waveform at the receiver.

78. A circuit for determining the frequency of a received and detected continuous wave waveform that was sampled at a predetermined sampling rate, wherein said circuit includes Fourier Transforms ("FTs") containing a predetermined number of bins N such that each bin comprises a predetermined number of frequencies, said circuit comprising:
(a) a first circuit for performing a first Fourier Transform ("FT") on a first sequence of samples to thereby generate a first set of FT bins;
(b) said first circuit for performing a second FT on a second sequence of samples to thereby generate a second set of FT bins wherein the first and second sequences of samples are contiguous and the first FT and the second FT are contiguous;
(c) means for determining the bin number of the bin with the overall largest amplitude from said first and second set of FT bins;
(d) means for determining the phase difference between the phase values for the bins from said first and second set of FT bins that have the same bin number as the bin number determined in step (c);
(e) dividing means for dividing said phase difference by the time duration of one FT to thereby determine a frequency offset;
(f) adding means for adding said frequency offset to the frequency for the bin with the largest amplitude determined in step (c) to thereby determine the frequency of the received waveform.

* * * * *